(12) United States Patent
Natori

(10) Patent No.: US 12,229,855 B2
(45) Date of Patent: Feb. 18, 2025

(54) IMAGE EDITING SUPPORT METHOD AND IMAGE EDITING SUPPORT DEVICE

(71) Applicant: SEIKO EPSON CORPORATION, Tokyo (JP)

(72) Inventor: Takashi Natori, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 221 days.

(21) Appl. No.: 17/943,388

(22) Filed: Sep. 13, 2022

(65) Prior Publication Data

US 2023/0083428 A1 Mar. 16, 2023

(30) Foreign Application Priority Data

Sep. 13, 2021 (JP) ................................. 2021-148613

(51) Int. Cl.
*G06T 11/60* (2006.01)

(52) U.S. Cl.
CPC .................... *G06T 11/60* (2013.01)

(58) Field of Classification Search
None
See application file for complete search history.

(56) References Cited

U.S. PATENT DOCUMENTS

| 5,684,940 | A | * | 11/1997 | Freeman | ................ | G06T 11/206 |
| | | | | | | 345/677 |
| 10,769,346 | B1 | * | 9/2020 | Yu | ........................ | G06F 3/0486 |
| 2006/0279432 | A1 | * | 12/2006 | Mori | ....................... | G01C 21/26 |
| | | | | | | 340/995.15 |
| 2010/0246996 | A1 | * | 9/2010 | Yamamoto | .............. | G06T 11/60 |
| | | | | | | 382/282 |
| 2012/0120104 | A1 | * | 5/2012 | Kuhne | ................. | G09B 29/006 |
| | | | | | | 345/629 |
| 2012/0154430 | A1 | * | 6/2012 | Matsushima | ......... | G06F 3/0488 |
| | | | | | | 345/619 |
| 2015/0309976 | A1 | * | 10/2015 | Bai | ....................... | G06F 40/166 |
| | | | | | | 715/255 |
| 2015/0369623 | A1 | * | 12/2015 | Blumenberg | .......... | G09G 5/377 |
| | | | | | | 701/532 |
| 2018/0260986 | A1 | * | 9/2018 | Girsova | ................ | G06T 11/206 |
| 2021/0142527 | A1 | * | 5/2021 | Gyurdiev | ............. | G09B 29/003 |
| 2022/0082404 | A1 | * | 3/2022 | Barre | ................. | G01C 21/3863 |
| 2022/0207800 | A1 | * | 6/2022 | Pozdnyakov | ........ | G09B 29/003 |

FOREIGN PATENT DOCUMENTS

| JP | 2010-238019 A | 10/2010 |
| JP | 2010-238135 A | 10/2010 |
| JP | 2012-133490 A | 7/2012 |

* cited by examiner

*Primary Examiner* — David H Chu
(74) *Attorney, Agent, or Firm* — Dority & Manning, P.A.

(57) ABSTRACT

An image editing support method includes obtaining a reference position in a first image in which at least one first object representing at least one of a character string and a diagram is arranged, identifying a target object as a first object located in a range including the reference position out of the at least one first object, receiving an operation of designating a largeness of a blank around the reference position, and moving the target object in accordance with the operation.

12 Claims, 6 Drawing Sheets

IMAGE EDITING SUPPORT METHOD AND IMAGE EDITING SUPPORT DEVICE

The present application is based on, and claims priority from JP Application Serial Number 2021-148613, filed Sep. 13, 2021, the disclosure of which is hereby incorporated by reference herein in its entirety.

BACKGROUND

1. Technical Field

The present disclosure relates to an image editing support method and an image editing support device.

2. Related Art

In interactive whiteboards, when a user performs an action of writing a diagram and so on using a pointer to a projection surface to which an image is projected, the diagram and so on are recognized as objects, and an image in which the objects are arranged is projected on the projection surface. Further, in the interactive whiteboards, it is possible to select the object having already been written using the pointer, and move the object thus selected with a drag operation using the pointer. There have been proposed a variety of technologies for supporting the movement of the object on the interactive whiteboard. As an example, there can be cited a technology disclosed in JP-A-2010-238135. In JP-A-2010-238135, there is disclosed a technology of reallocating objects including an object movement of which is instructed by the user and other objects so as not to overlap each other when the object designated by the user overlaps the other objects at the destination of the object designated by the user.

For example, when further writing an object C between an object A and an object B which have already been written, it is necessary to move the object A and the object B to create a blank for writing the object C. In the technology disclosed in JP-A-2010-238135, in order to create the blank for writing the object C, it is necessary to individually move each of the object A and the object B taking moving directions and moving amounts into consideration, and it is unachievable to create the blank with a simple operation.

SUMMARY

An image editing support method according to an aspect of the present disclosure includes obtaining a reference position to be a reference when changing a largeness of a blank in a first image in which at least one first object representing at least one of a character string and a diagram is arranged, identifying a movement target object as a first object located in a predetermined range including the reference position out of the at least one first object, and moving the movement target object in accordance with an operation for moving the movement target object when the operation is performed by a user.

An image editing support device according to an aspect of the present disclosure includes a display device configured to display a first image in which at least one first object representing at least one of a character string and a diagram is arranged, and a processing device. The processing device is configured to execute obtaining a reference position to be a reference when changing a largeness of a blank in the first image, identifying a movement target object as a first object located in a predetermined range including the reference position out of the at least one first object, and moving the movement target object in accordance with an operation for moving the movement target object when the operation is performed by a user.

DESCRIPTION OF AN EXEMPLARY EMBODIMENT

An embodiment described hereinafter is provided with a variety of technically preferable limitations. However, the embodiment of the present disclosure is not limited to an aspect described below.

1. Embodiment

Figure 1:
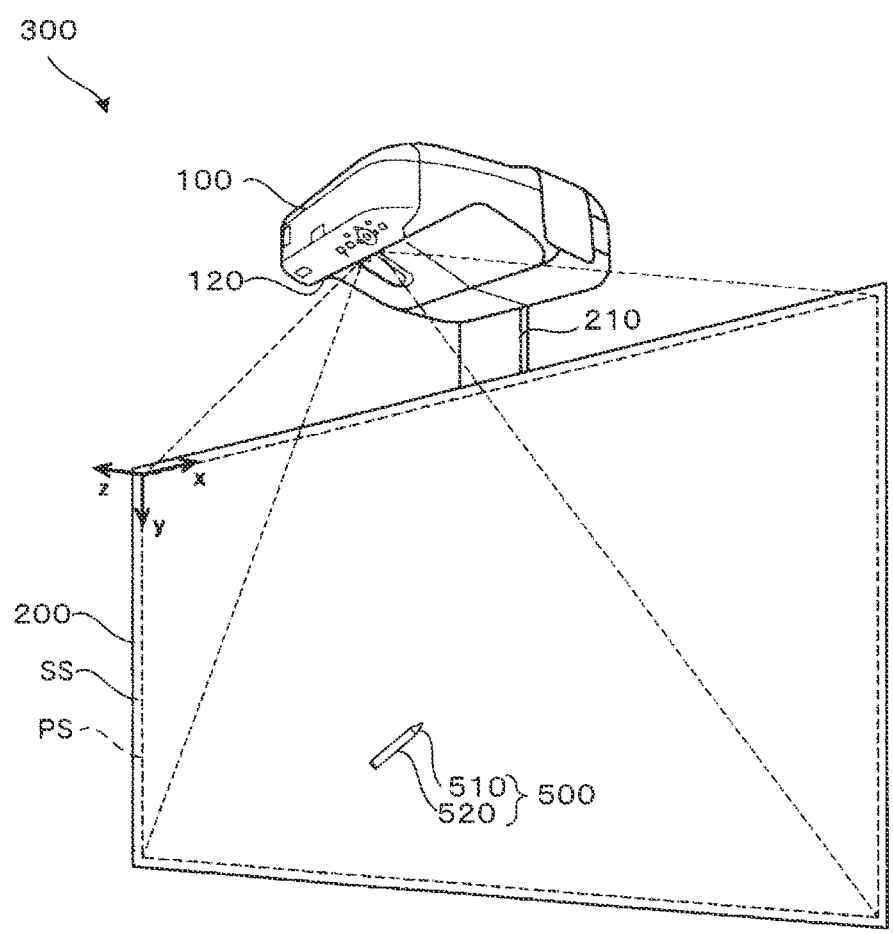
FIG. 1 is a perspective view of a projection system 300 including a projector 100 according to an embodiment of the present disclosure.
Figure 2:
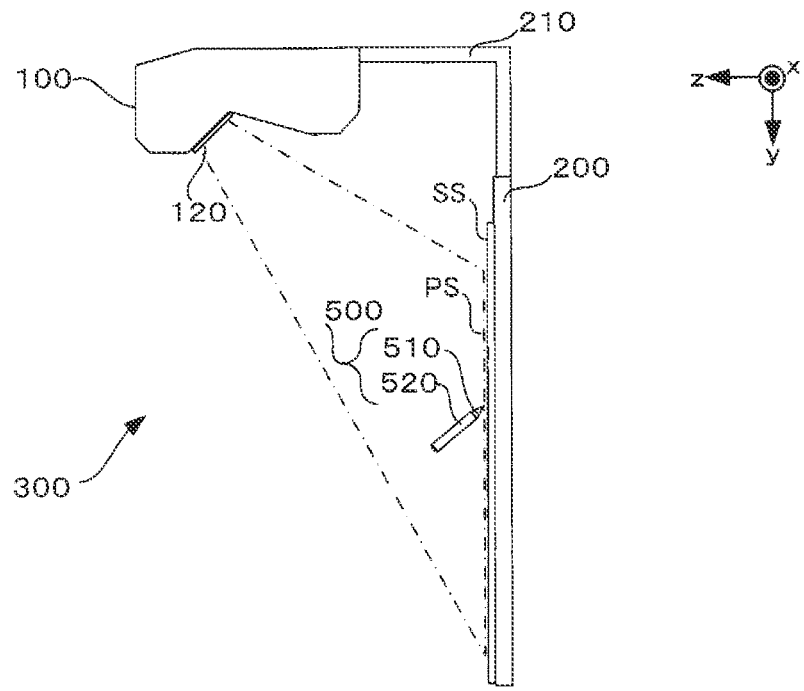
FIG. 2 is a side view of the projection system 300.

FIG. 1 is a perspective view of a projection system 300 including a projector 100 as an embodiment of an image editing support device according to the present disclosure. FIG. 2 is a side view of the projection system 300. The projection system 300 functions as an interactive whiteboard. As shown in FIG. 1 and FIG. 2, the projection system 300 includes a projection plate 200 and a pointer 500 besides the projector 100.

A front surface of the projection plate 200 is used as a projection surface SS on which an image is projected by the projector 100. As shown in FIG. 1 and FIG. 2, the projector 100 is fixed in front of and vertically above the projection plate 200 with a support member 210. Although in the present embodiment, the projection plate 200 is disposed so as to erect vertically, it is possible to configure the projection system 300 by disposing the projection plate 200 so as to lie horizontally, and disposing the projector 100 vertically above the projection plate 200. As shown in FIG. 1, hereinafter, a coordinate axis in the vertical direction is referred to as a y axis, a coordinate axis along a normal line of the projection plate 200 is referred to as a z axis, and a coordinate axis perpendicular to both of the y axis and the z axis is referred to as an x axis, respectively.

The projector 100 projects a display image PS on the projection surface SS of the projection plate 200 to thereby display the display image PS on the projection surface SS. The projection surface SS means a surface of a member on which the image is projected. The pointer 500 has a tip portion 510 and a shaft 520. It is possible for the user of the projection system 300 to perform an operation of drawing an object such as a character or a diagram on the projection surface SS by gripping the shaft 520 in his or her hand, and moving the pointer 500 while making the tip portion 510 have contact with the projection surface SS so as to trace the projection surface SS. The tip portion 510 is provided with a light emitter not shown. The light emitter emits infrared light only when having contact with the projection surface SS, and does not emit the infrared light when not having contact therewith.

The projector 100 incorporates an imaging device 120. The imaging device 120 is installed with a field angle with which at least the entire area of the projection surface SS can be imaged. In the imaging device 120, there is installed a visible light cutoff filter not shown. More particularly, the visible light cutoff filter incorporated in the imaging device 120 has a property of transmitting infrared light emitted from the tip portion 510 of the pointer 500 while blocking the visible light such as light projected from the projector 100, light of an illumination of a room in which the projector 100 is installed, and natural light. The imaging device 120 takes an image represented by the light transmitted through the visible light cutoff filter. Therefore, an image of the visible light such as the illumination light, the natural light, and the light projected from the projector 100 is not taken by the imaging device 120, but an image represented by the infrared light emitted from the tip portion 510 of the pointer 500 is taken by the imaging device 120. Therefore, in the taken image by the imaging device 120, an area of the tip portion 510 of the pointer 500 emits light, but other areas do not emit light. The projector 100 detects a contact position of the pointer 500 with the projection surface SS based on the taken image by the imaging device 120.

Figure 3:
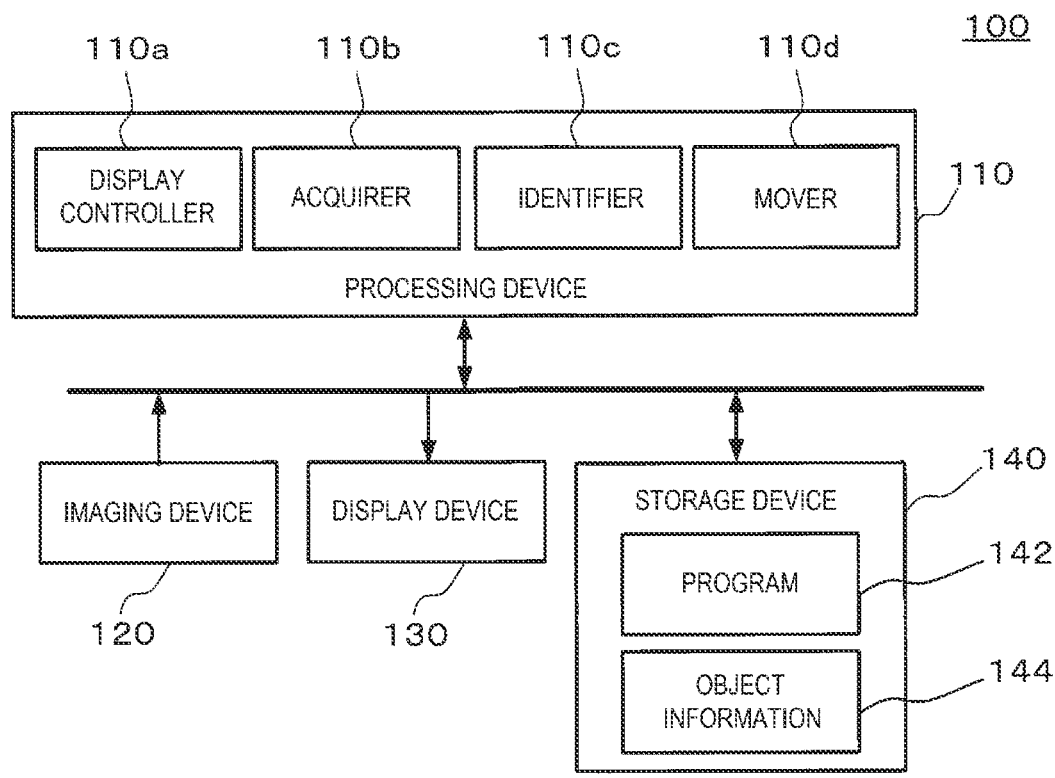
FIG. 3 is a diagram showing a configuration example of the projector 100.

FIG. 3 is a block diagram showing a configuration example of the projector 100. As shown in FIG. 3, the projector 100 includes a processing device 110, a display device 130, and a storage device 140 besides the imaging device 120. It should be noted that the projector 100 can also include an input device provided with a plurality of operators such as a numerical keypad, and a communication device for performing communication with other devices via a communication network such as a wired LAN (Local Area Network) or a wireless LAN besides the processing device 110, the imaging device 120, the display device 130, and the storage device 140. For example, the input device is a device for making the user of the projector 100 perform a variety of input operations related to an operation setting of the projector 100. The communication device is used for a reception of image data transmitted from an image supply device such as a personal computer.

The processing device 110 is configured including a processor such as a CPU (Central Processing Unit), namely a computer. The processing device 110 can be formed of a single computer, or can also be formed of a plurality of computers. The processing device 110 acts with a program 142 stored in the storage device 140 to thereby function as a center of control of the projector 100.

The imaging device 120 takes an image of the projection surface SS at specific time intervals such as several milliseconds under the control by the processing device 110. The imaging device 120 outputs the image data representing the taken image to the processing device 110 every time the imaging device 120 takes the image of the projection surface SS. Hereinafter, the image data output from the imaging device 120 to the processing device 110 is referred to as taken image data. The processing device 110 analyzes the taken image data sequentially output from the imaging device 120 to detect the contact position of the pointer 500 and a trajectory drawn using the pointer 500. The processing device 110 detects objects written by the user and writing positions of the respective objects for each of the objects based on the trajectory drawn with the pointer 500.

In the present embodiment, as a specific example of the object to be written by the user using the pointer 500, there can be cited at least one character string, at least one diagram, or a combination of the character string and the diagram to be written by the user using the pointer 500. It should be noted that regarding a specific algorism of detecting the object and the writing position of the object from the taken image data sequentially output from the imaging device 120, there is adopted an existing technology as needed. For example, when an end point of a first trajectory representing a character string is detected, and then writing of a second trajectory representing a diagram is detected at a point at a distance longer than a predetermined threshold value from the end point, the processing device 110 judges that the first trajectory and the second trajectory each correspond to an individual object, and detects the object of the character string based on the first trajectory, and detects the object of the diagram based on the second trajectory. In contrast, when the end point of the first trajectory is detected, and then the writing of the second trajectory as a new trajectory is detected at a point at a distance shorter than the predetermined threshold value from the end point, the processing device 110 detects one object as a combination of the character string and the diagram based on the first trajectory and the second trajectory.

The display device 130 is a projection device for projecting the display image PS on the projection surface SS in accordance with the image signal provided from the processing device 110. Although the detailed illustration is omitted in FIG. 3, the display device 130 includes a projection optical system including a projection lens, a liquid crystal driver, a liquid crystal panel, and a light source section. The liquid crystal driver drives the liquid crystal panel in accordance with the image signal provided from the processing device 110 to thereby draw the image represented by the image signal on the liquid crystal panel. The light source section includes a light source such as a halogen lamp or a laser diode. The light from the light source section is modulated by the liquid crystal panel pixel by pixel, and is projected on the projection surface SS by the projection optical system.

In the present embodiment, the processing device 110 generates the image signal representing the display image PS in which the object detected by analyzing the taken image data is arranged at the writing position of the object in a background image with a single color such as white. Since the objects written by the user using the pointer 500 are arranged at the respective writing positions in the display image PS, there is realized an interactive whiteboard. It should be noted that since the visible light forming the background image is blocked by the visible light cutoff filter incorporated in the imaging device 120, there is no chance for the visible light forming the background image to affect the detection of the object. The image data representing the background image can be generated inside the projector 100, or can also be obtained from the image supply device with the data communication using a communication device.

The storage device 140 is a recording medium which can be read by the processing device 110. The storage device 140 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 140, there is stored the program 142 for making the processing device 110 execute processing conspicuously representing features of the present disclosure. Although the detailed illustration is omitted in FIG. 2, the nonvolatile memory stores a variety of types of configuration information defining the operation of the projector 100. As a specific example of the configuration information, there is cited correction information representing a keystone correction and so on to be performed on the display image PS. The volatile memory of the storage device 140 is used by the processing device 110 as a work area when executing the program 142.

Figure 4:
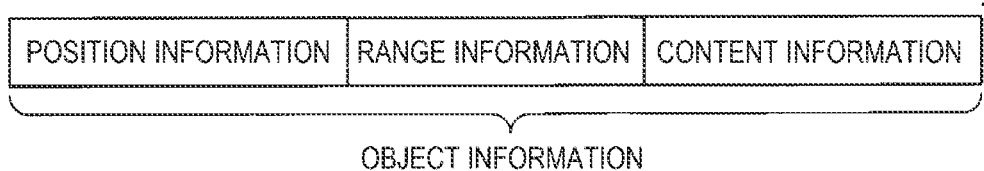
FIG. 4 is a diagram showing an example of object information 144.

Further, the volatile memory stores information to be generated in the process of making the processing device 110 execute the program 142. In the information generated in the process of making the processing device 110 execute the program 142, there is included object information 144 representing the object. The object information 144 is generated object by object. FIG. 4 is a diagram showing an example of the object information 144. As shown in FIG. 4, in the object information 144, there are included position information representing the writing position of the object, range information representing a range of the object, and content information representing a content of the object. The position information represents a coordinate of the center of the object, more specifically, a coordinate of the center of a minimum circumscribed rectangle of the object. The range information represents a size of the minimum circumscribed rectangle of the object. The content information represents an image of a character string, a diagram, or a combination of the diagram and the character string written in that rectangle. Hereinafter, the object the coordinate of the center, the range, and the content of which are represented by the object information 144 is referred to as a written object, and a rectangle zoning the range represented by the object information 144 is referred to as an extension of the written object or a profile including the written object. The written object is an example of a first object in the present disclosure.

The processing device 110 reads the program 142 out from the nonvolatile memory to the volatile memory taking powering-ON of the projector 100 as a trigger, and then starts execution of the program 142 thus read out. The processing device 110 which is operating in accordance with the program 142 functions as a display controller 110a, an acquirer 110b, an identifier 110c, and a mover 110d. The display controller 110a, the acquirer 110b, the identifier 110c, and the mover 110d shown in FIG. 3 are software modules realized by making the processing device 110 operate in accordance with the program 142. The functions played respectively by the display controller 110a, the acquirer 110b, the identifier 110c, and the mover 110d are as follows.

The display controller 110a generates the image signal representing the display image PS based on the object information 144 stored in the volatile memory of the storage device 140, and then executes the processing of providing the image signal thus generated to the display device 130 periodically at intervals of, for example, several milliseconds. It should be noted that under the situation in which no object is written on the projection surface SS, the display controller 110a provides the image signal representing the background image to the display device 130. When the object written by the user is detected by analyzing the taken image data, the display controller 110a writes the object information 144 representing the object thus detected in the volatile memory of the storage device 140. Thereafter, the display controller 110a generates the image signal representing the display image PS in which the written object is arranged based on the object information 144 stored in the volatile memory of the storage device 140, and then provides the image signal thus generated to the display device 130. In other words, the display controller 110a is a functional block for realizing the interactive whiteboard.

Figure 5:
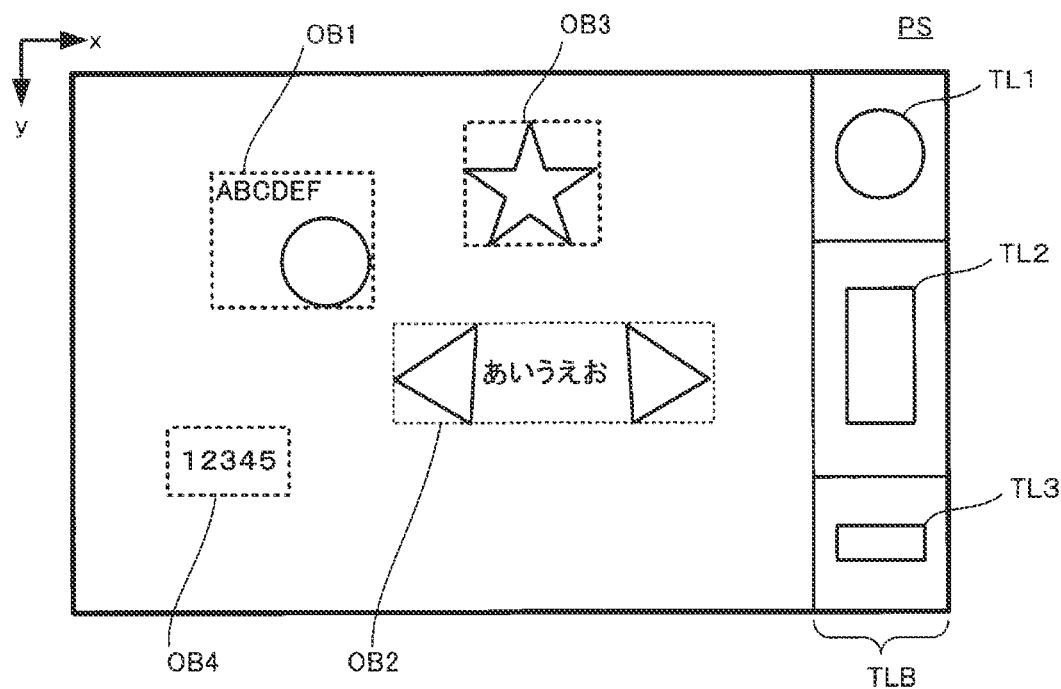
FIG. 5 is a diagram showing an example of a display image PS to be projected by the projector 100.

In the present embodiment, the display controller 110a provides the display image PS with a toolbar in which a plurality of types of objects corresponding to tools for making the user designate a largeness of a blank centering on a reference position to be designated by the user in the display image PS are arranged. The object corresponding to the tool is hereinafter referred to as a tool object. FIG. 5 is a diagram showing an example of the display image PS. In the display image PS shown in FIG. 5, there are arranged a written object OB1, a written object OB2, a written object OB3, a written object OB4, and a toolbar TLB. Although the four written objects are arranged in the display image PS shown in FIG. 5, the number of the written objects arranged in the display image PS can be 1 through 3, and can also be 5 or more. In short, it is sufficient to arrange at least one written object in the display image PS.

The written object OB1 is an object constituted by a character string and a circle. The written object OB2 is an object constituted by a character string and two triangles. The written object OB3 is an object formed of a star-shaped diagram. The written object OB4 is an object formed of a character string. It should be noted that dotted lines in FIG. 5 represent the extensions of the respective written objects. In the present embodiment, in order to clearly specify the extensions of the respective written objects, the images representing the respective rectangles drawn with the dotted lines in FIG. 5 are displayed so as to be superimposed on the display image PS. The images representing the respective rectangles drawn with the dotted lines in FIG. 5 are an example of a third image in the present disclosure.

In the toolbar TLB in FIG. 5, there are arranged a tool object TL1, a tool object TL2, and a tool object TL3 corresponding respectively to three types of tools different in moving direction of the written object when enlarging the blank from each other. By performing drag and drop of any one of the tool object TL1, the tool object TL2, and the tool object TL3 at a position where the enlargement of the blank is desired and then performing a predetermined operation, it is possible for the user to designate that position as a reference position to be a reference when changing the largeness of the blank.

The tool object TL1, the tool object TL2, and the tool object TL3 respectively represent diagrams different in shape from each other. Specifically, the tool object TL1 represents a circle, the tool object TL2 represents a rectangular shape having long sides along the y axis, and the tool object TL3 represents a rectangular shape having long sides along the x axis. In the present embodiment, the moving direction of the written object when enlarging the blank becomes the direction along the axis decided in accordance with the shape of the tool object thus selected. The moving direction by the tool object TL1 is a direction of getting away from the reference position along an axis passing through the reference position and a position of the center of the written object to be the movement target. In other words, by using the tool object TL1, it is possible for the user to radially move the written object centering on the reference position. The moving direction by the tool object TL2 is a direction of getting away from the reference position along an axis along the long sides of the rectangular shape represented by the tool object TL2, namely the y axis. The moving direction by the tool object TL3 is a direction of getting away from the reference position along an axis along the long sides of the rectangular shape represented by the tool object TL3, namely the x axis. The tool objects are each an example of a second object in the present disclosure.

The acquirer 110b obtains the reference position. In the present embodiment, when the tool object having been dragged and dropped is continuously held down by the pointer 500 for a time T, the acquirer 110b decides the position of the center of the tool object as the reference position, and then obtains the reference position. Thus, it is avoided that the reference position is erroneously decided in the drag-and-drop process. It should be noted that in order to clearly show the fact that the reference position is decided to the user, it is possible for the display controller 110a to make the display color of the tool object having been dragged and dropped different between before and after the decision of the reference position.

The identifier 110c determines whether or not the written object at least partially overlaps a predetermined range including the reference position for each of the written objects. Then, the identifier 110c identifies the written object at least partially overlapping the predetermined range including the reference position as a movement target object. In the present embodiment, a range in which the tool object having been dragged and dropped for designating the reference position exists in the display image PS becomes the predetermined range described above. For example, when the tool object TL1 has been dragged and dropped, an inside of the circle represented by the tool object TL1 becomes the predetermined range. When the tool object TL2 has been dragged and dropped, an inside of the rectangular shape represented by the tool object TL2 becomes the predetermined range. Similarly, when the tool object TL3 has been dragged and dropped, an inside of the rectangular shape represented by the tool object TL3 becomes the predetermined range.

In a period in which the operation of designating the largeness of the blank is performed on the tool object having been dragged and dropped for designating the reference position, the mover 110d moves the movement target object in the direction of getting away from the reference position along the axis corresponding to the shape of that tool object. The operation of designating the largeness of the blank is referred to as a largeness designation operation. The largeness designation operation in the present embodiment is an operation of continuing to hold down the tool object with the pointer 500 after deciding the reference position. In other words, in the present embodiment, an amount of the movement of the movement target object is decided in accordance with a time length of the period in which the largeness designation operation is performed. Further, the mover 110d updates the object information 144 of the movement target object in accordance with the movement of the movement target object.

Figure 6:
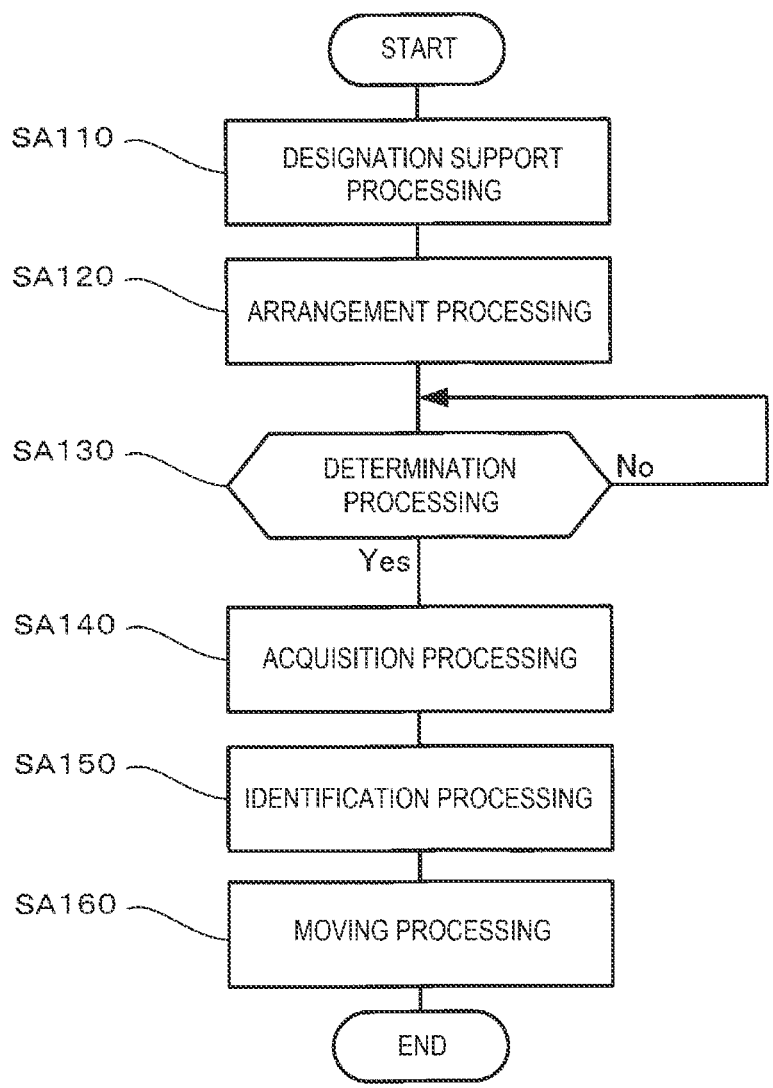
FIG. 6 is a flowchart showing an editing support method to be executed by a processing device 110 of the projector 100 in accordance with a program 142.

Further, the processing device 110 which is operating in accordance with the program 142 executes an image editing support method shown in FIG. 6. As shown in FIG. 6, the image editing support method according to the present embodiment includes designation support processing SA110, arrangement processing SA120, determination processing SA130, acquisition processing SA140, identification processing SA150, and moving processing SA160.

In the designation support processing SA110, the processing device 110 functions as the display controller 110a. In the designation support processing SA110, the processing device 110 displays the display image PS on the projection surface SS to thereby receive an operation of designating the reference position. As described above, by dragging and dropping any one of the tool objects using the pointer 500, and then continuing to hold down the tool object for the certain time T, it is possible for the user to designate the reference point.

In the arrangement processing SA120 following the designation support processing SA110, the processing device 110 functions as the display controller 110a. In the arrangement processing SA120, the processing device 110 arranges the tool object selected by the drag-and-drop operation at a position designated by a drag-and-drop operation in the display image PS.

In the determination processing SA130 following the arrangement processing SA120, the processing device 110 functions as the acquirer 110b. In the determination processing SA130, the processing device 110 determines whether or not the tool object having been arranged by the drag-and-drop operation has been held down with the pointer 500 for the certain time T. When the determination result in the determination processing SA130 is "No," the processing device 110 executes the determination processing SA130 once again. When the determination result in the determination processing SA130 is "Yes," the processing device 110 executes the acquisition processing SA140.

In the acquisition processing SA140, the processing device 110 functions as the acquirer 110b. In the acquisition processing SA140, the processing device 110 obtains the position of the center of the tool object arranged in the display image PS by the drag-and-drop operation as the reference position.

In the identification processing SA150 following the acquisition processing SA140, the processing device 110 functions as the identifier 110c. In the identification processing SA150, the processing device 110 identifies the written object at least partially overlapping the predetermined range including the reference position as the movement target object.

In the moving processing SA160 following the identification processing SA150, the processing device 110 functions as the mover 110d. In the moving processing SA160, in the period in which the largeness designation operation is performed on the tool object having been dragged and dropped for designating the reference position, the processing device 110 moves the movement target object identified in the identification processing SA150 in the direction of getting away from the reference position along the axis corresponding to the shape of that tool object.

Figure 7:
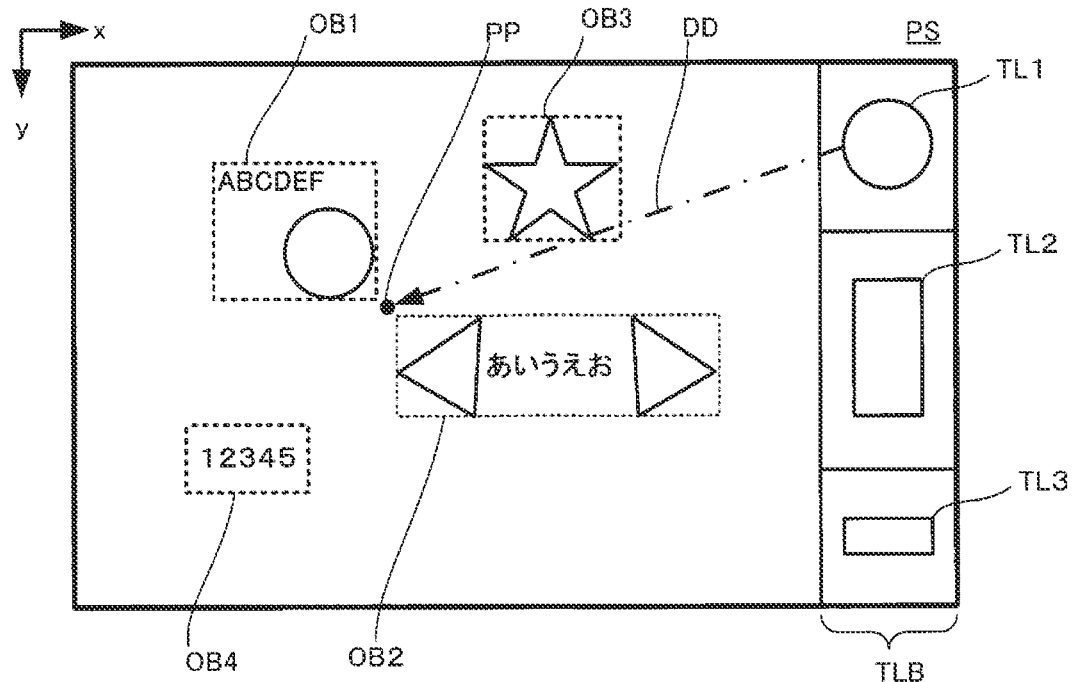
FIG. 7 is a diagram for explaining an operation example of the projector 100.
Figure 8:
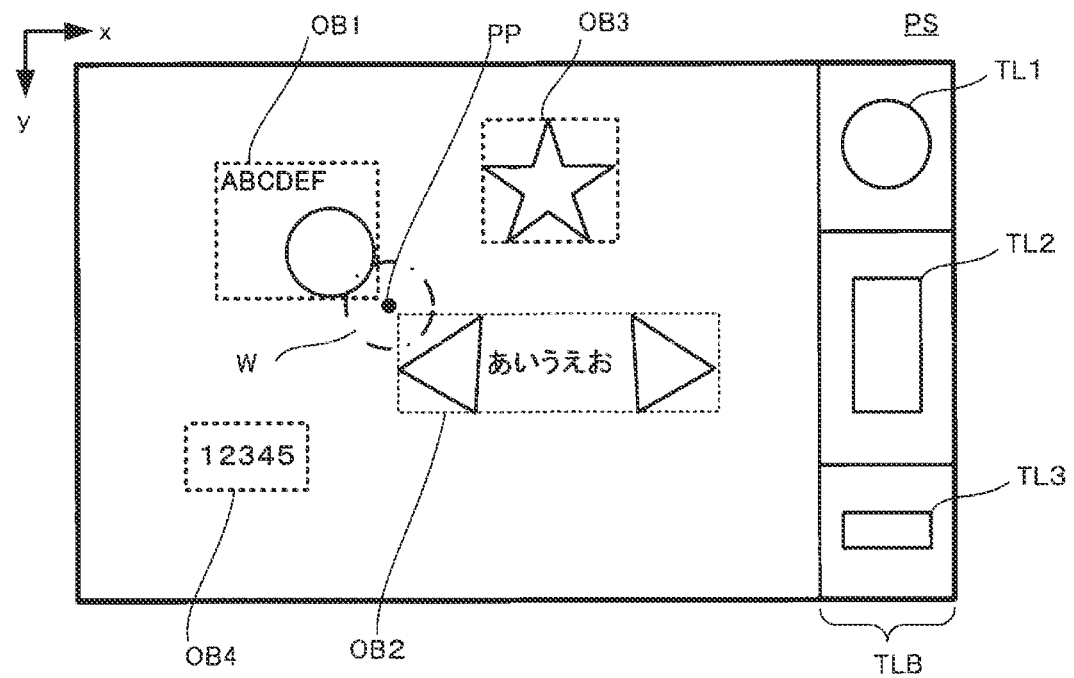
FIG. 8 is a diagram for explaining an operation example of the projector 100.

It is assumed that in the designation support processing SA110, under the situation in which the display image PS shown in FIG. 5 is displayed on the projection surface SS, the tool object TL1 is selected using the pointer 500, and is dragged and dropped to a position PP as indicated by an arrow DD in FIG. 7. In this case, in the arrangement processing SA120, the processing device 110 arranges the tool object TL1 at the position PP in the display image PS as represented by the dashed-dotted line in FIG. 8. When the tool object TL1 represented by the dashed-dotted line in FIG. 8 continues to be held down by the pointer 500 for the time T, the determination result of the determination processing SA130 becomes "Yes," and the processing device 110 performs the acquisition processing SA140. In the acquisition processing SA140, the processing device 110 decides the position PP of the center of the tool object TL1 represented by the dashed-dotted line in FIG. 8 as the reference position, and obtains the reference position. It should be noted that the dashed-dotted line in FIG. 8 represents a predetermined range W.

In the identification processing SA150 following the acquisition processing SA140, the processing device 110 determines whether or not each of the written object OB1, the written object OB2, the written object OB3, and the written object OB4 is the movement target object. In the example shown in FIG. 8, although the written object OB1 and the written object OB2 both partially overlap the predetermined range W, none of the written object OB3 and the written object OB4 overlaps the predetermined range W. Therefore, in the example shown in FIG. 8, the written object OB1 and the written object OB2 each become the movement target object.

Figure 9:
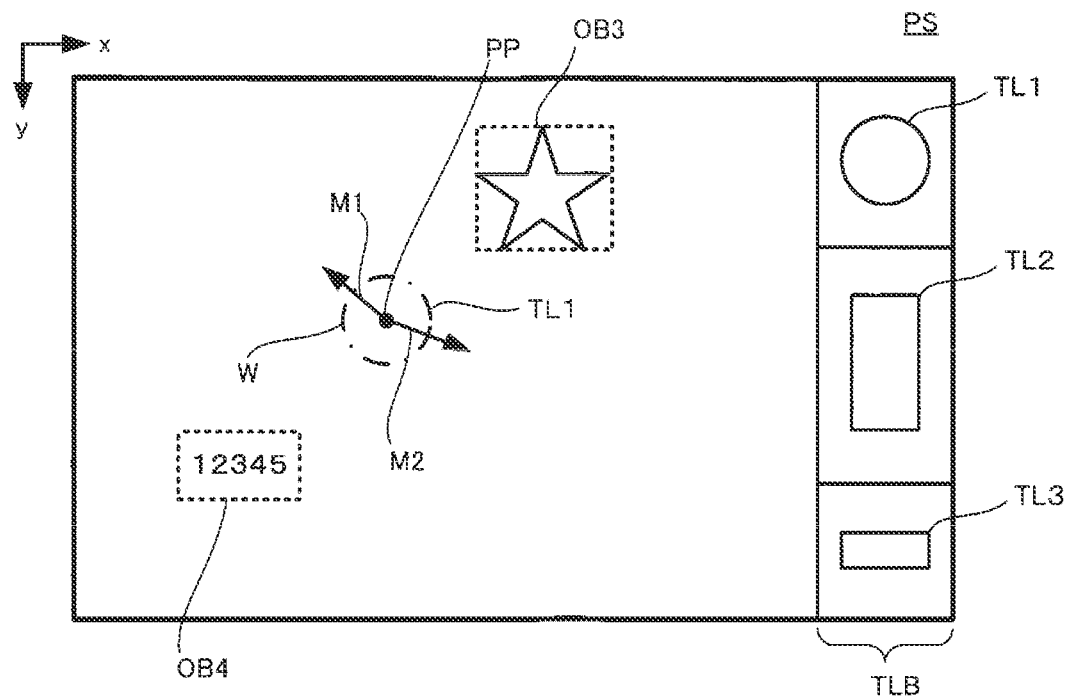
FIG. 9 is a diagram for explaining an operation example of the projector 100.

In the moving processing SA160 following the identification processing SA150, during the period in which the largeness designation operation is performed on the tool object TL1 having been dragged and dropped to the position PP, the processing device 110 radially moves the movement target object in a direction of getting away from the position PP. Specifically, the processing device 110 moves the written object OB1 in a direction indicated by an arrow M1 in FIG. 9 along an axis passing through the center of the written object OB1 and the position PP at the time point when the largeness designation operation is started. Further, the processing device 110 moves the written object OB2 in a direction indicated by an arrow M2 in FIG. 9 along an axis passing through the center of the written object OB2 and the position PP at the time point when the largeness designation operation is started. It should be noted that in FIG. 9, in order to avoid the complication of the drawings, an illustration of the written object OB1 and the written object OB2 is omitted.

Figure 10:
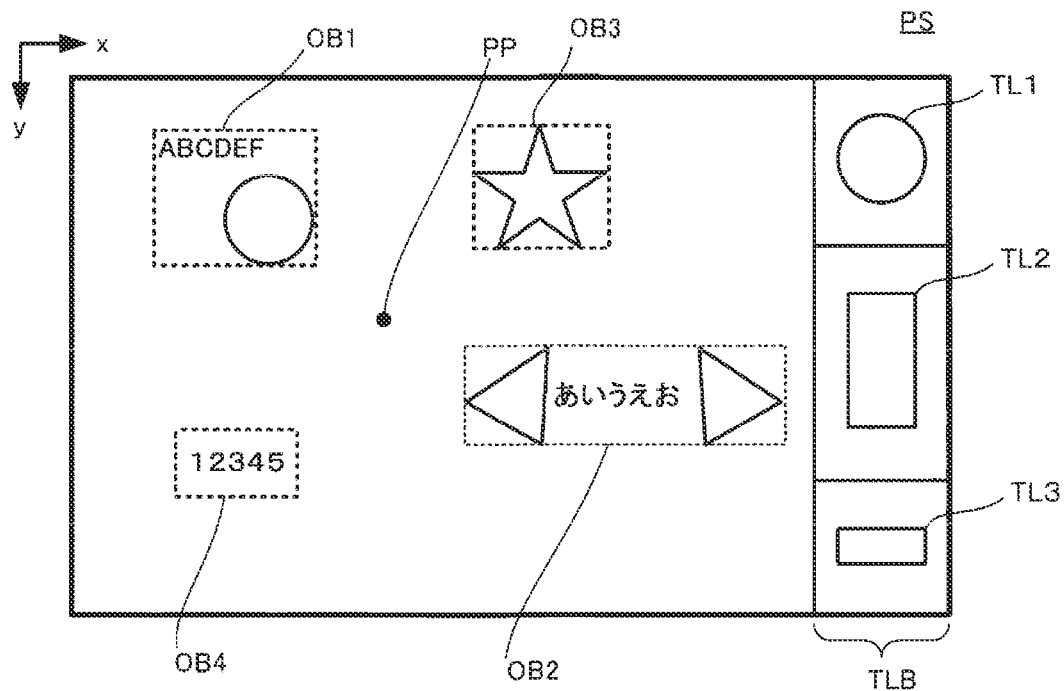
FIG. 10 is a diagram for explaining an operation example of the projector 100.

As a result of the execution of the operation described hereinabove, the display image PS is updated as shown in FIG. 10. As is obvious from the comparison between FIG. 10 and FIG. 5, in the display image PS shown in FIG. 10, the blank between the written object OB1 and the written object OB2 is enlarged compared to the display image PS shown in FIG. 5. As described above according to the present embodiment, it becomes possible to create the blank in the display image PS with a simple operation of dragging and dropping the any one of the tool objects to the position where the change in largeness of the blank is desired, and then continuing to hold down that tool object.

2. Modifications

The embodiment described above can be modified as follows.

(1) The largeness designation operation is the operation of enlarging the blank in the embodiment described above, but can be an operation for reducing the blank. The operation for enlarging the blank is an example of a first operation in the present disclosure. The operation for reducing the blank is an example of a second operation in the present disclosure. When the second operation is performed on the tool object having been dragged and dropped in the display image PS for designating the reference position, the processing device 110 moves the movement target object in a direction of coming closer to the reference position along an axis decided in accordance with the shape of the tool object.

(2) In the embodiment described above, the movement of the movement target object is performed with the movement amount corresponding to the length of the period in which the largeness designation operation is performed. However, when the largeness designation operation is an operation of tapping on the tool object, the movement amount corresponding to the single largeness designation operation can be decided in advance. Further, when an operator such as the numerical keypad or a cursor key is provided to the projector 100, it is possible to designate the movement amount for each of the movement target objects by inputting a numerical value representing the movement amount of the movement target object by the operation of the operator. Further, when the projector 100 has a plurality of operators, it is possible to assign a first operator out of the plurality of operators to the first operation, and to assign a second operator different from the first operator to the second operation. In this aspect, it is possible to identify which one of the first operation and the second operation is performed in accordance with the type of the operator operated, and to identify the moving direction of the movement target object in accordance with the operation thus identified.

(3) It is possible to stop the movement of the movement target object which has become to fail to overlap the predetermined range due to the movement corresponding to the largeness designation operation. In other words, it is sufficient for an upper limit of the movement amount of the movement target object to be decided in accordance with the length of the period in which the largeness designation operation is performed, or how many times the operation has been operated.

(4) Although in the embodiment described above, the designation of the reference position is performed using the tool objects, it is possible for the reference position to be designated by, for example, tapping on the display image PS, and it is possible to define the inside of the circle or the rectangle having a predetermined size cantering on the reference position as the predetermined range. In the aspect in which the inside of the circle or the rectangle having the predetermined size centering on the reference position is defined as the predetermined range, it is conceivable to define an operation of continuing to hold down an arbitrary point in the predetermined range using the pointer 500 as the largeness designation operation. In other words, the tool objects are not essential constituent elements of the present disclosure, and can be omitted. In an aspect in which the tool objects are not used, the arrangement processing SA120 and the determination processing SA130 can be omitted. In the aspect in which the tool objects are not used, the display of the toolbar TLB is also unnecessary. In the aspect in which the toolbar TLB is not displayed, the designation support processing SA110 is a common processing in the projector. Therefore, it is sufficient for the editing support method according to the present disclosure to include the acquisition processing SA140, the identification processing SA150, and the moving processing SA160. It should be noted that when the tool objects are not used, it is possible for the image representing the extension of the predetermined range to be displayed so as to be superimposed on the display image PS in order to clearly show the predetermined range to the user.

(5) It is possible to make the image showing the extension of the movement target object and the image showing the extension of the written object other than the movement target object different in at least one of a type and a color of the line representing the extension from each other so that the discrimination between the movement target object and the written object other than the movement target object becomes clear. It should be noted that the display of the images showing the extensions of the movement target object and the written object other than the movement target object is not essential, and can be omitted.

(6) When the distance between the movement target object and the other written object, more specifically, the distance between the center of the movement target object and the center of the other written object, becomes shorter than the predetermined threshold value by moving the movement target object, it is possible for the other written object to be moved together with the movement target object. Specifically, when the distance between the movement target object and the other written object becomes shorter than the predetermined threshold value by moving the movement target object, the processing device 110 merges the movement target object and the other written object described above into one object. For example, the processing device 110 defines a minimum rectangle including the movement target object and the other written object described above as the range of the merged object described above, and at the same time, defines the center of the rectangle as the center of the merged object. Thereafter, the processing device 110 moves the merged object as a new movement target object.

(7) The display device 130 in the embodiment described above is a projection device for projecting an image on the projection plate 200. However, the display device 130 can be a liquid crystal display or the like. In short, it is sufficient for the display device 130 to be a device of displaying the display image PS in which at least one written object representing at least one of a character string and a diagram is arranged.

(8) The display controller 110*a*, the acquirer 110*b*, the identifier 110*c*, and the mover 110*d* in the embodiment described above are the software modules. However, any one, some, or all of the display controller 110*a*, the acquirer 110*b*, the identifier 110*c*, and the mover 110*d* can each be a hardware module such as an ASIC (Application Specific Integrated Circuit). Even when any one of the display controller 110*a*, the acquirer 110*b*, the identifier 110*c*, and the mover 110*d* is a hardware module, or some or all of the display controller 110*a*, the acquirer 110*b*, the identifier 110*c*, and the mover 110*d* are hardware modules, the same advantages as in the embodiment described above are exerted.

(9) The program 142 can be manufactured alone, or can be provided with or without consideration. As a specific aspect when providing the program 142, there can be cited an aspect of writing the program 142 in a computer-readable recording medium such as a flash ROM to provide the recording medium, and an aspect of providing the program 142 by downloading the program 142 via a telecommunication line such as the Internet. By making a general computer operate with the program 142 provided in these aspects, it becomes possible to make the computer function as the editing support device according to the present disclosure.

3. Aspects Figured Out from at Least One of Embodiment and Modified Examples

The present disclosure is not limited to the embodiment and the modified examples described above, but can be implemented in a variety of aspects within the scope or the spirit of the present disclosure. For example, the present disclosure can also be implemented in the following aspects. The technical features in the embodiment described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

The image editing support method according to an aspect of the present disclosure includes the acquisition processing SA140, the identification processing SA150, and the moving processing SA160. The acquisition processing SA140 is the processing of obtaining the reference position to be the reference when changing the largeness of the blank in the display image PS in which at least one written object representing at least one of a character string and a diagram is arranged. The written object is an example of the first object in the present disclosure. The display image PS is an example of a first image in the present disclosure. The identification processing SA150 is the processing of identifying the movement target object as the written object located in the predetermined range including the reference position described above out of the at least one written object. The moving processing SA160 is the processing of moving the movement target object in accordance with the operation for moving the movement target object when the operation described above has been performed by the user. According to the image editing support method of the present aspect, since it is possible to move the movement target objects in a lump in accordance with the operation for moving the movement target object, it becomes possible to create the blank with a desired largeness with a simple operation to the display image PS in which at least one written object is arranged.

In the image editing support method according to a more preferable aspect, the operation can include the first operation for enlarging the blank and the second operation for reducing the blank. When the first operation and the second operation are included in the operation, it is possible for the moving direction of moving the movement target object to be identified in accordance with whether the operation is the first operation or the second operation. Specifically, it is sufficient for the moving direction corresponding to the first operation to be the direction in which the movement target object gets away from the reference position. Further, it is sufficient for the moving direction corresponding to the second operation to be the direction in which the movement target object comes closer to the reference position. In the present aspect, the movement target object moves in the direction of getting away from the reference position in accordance with the first operation. Further, the movement target object moves in the direction of coming closer to the reference position in accordance with the second operation. According to the present aspect, since it is possible to move the movement target objects in a lump by performing the first operation for enlarging the blank or the second operation for reducing the blank, it becomes possible to create the blank having the desired largeness with a simple operation to the display image PS in which at least one written object is arranged.

In the image editing support method according to another preferable aspect, the image with the dashed-dotted line representing the extension of the predetermined range can be displayed so as to be superimposed on the written object. The image with the dashed-dotted line representing the extension of the predetermined range is an example of the second image in the present disclosure. According to the present aspect, it is possible to clearly show the extension of the predetermined range to the user.

In the image editing support method according to another preferable aspect, the tool object for receiving the operation can be displayed at the reference position. The tool object is an example of the second object in the present disclosure. According to the present aspect, by performing an operation to the tool object, it is possible to move the movement target objects in a lump. In this aspect, the predetermined range can be a range in which the tool object exists in the display image PS. According to the present aspect, it is possible to clearly show the predetermined range to the user by the display of the tool object.

In the image editing support method according to another preferable aspect, the moving direction of the movement target object can be the direction along the axis decided in accordance with the shape of the tool object. In the present aspect, since the moving direction of the movement target object is decided in accordance with the shape of the tool object, by preparing a variety of shapes of tool objects in advance, and making the user select the tool object to be arranged at the reference position, it becomes possible to make the user designate the moving direction of the movement target object.

In the image editing support method according to another preferable aspect, an upper limit of the amount of the movement of the movement target object can be decided in accordance with the length of the period in which the operation continues. According to the present aspect, it is possible to make the user designate the amount of the movement of the movement target object in accordance with the length of the period in which the operation for moving the movement target object continues. It should be noted that the movement of the movement target object which becomes to fail to overlap the predetermined range can be stopped. According to the present aspect, it becomes possible to easily create the blank with the largeness corresponding to the predetermined range.

In the image editing support method according to another preferable aspect, the image showing the extension of the written object can be displayed so as to be superimposed on the display image PS. The image showing the extension of the written object is an example of the third image in the present disclosure. According to the present aspect, it becomes possible to clearly show the extension of the written object to the user.

In the image editing support method according to another preferable aspect, another written object representing at least one of a character string and a diagram different from the movement target object can be arranged in the display image PS. The other written object different from the movement target object is an example the third object in the present disclosure. Further, in this aspect, when the distance between the center of the movement target object and the center of the other written object becomes shorter than the threshold value determined in advance by moving the movement target object, the processing of moving the other written object together with the movement target object can be executed. According to the present aspect, it becomes possible to prevent the movement target object moving in accordance with the first operation or the second operation from overlapping the other written objects without performing any other operations.

Further, the image editing support device according to an aspect of the present disclosure is provided with the display device 130 for displaying the display image PS in which at least one written object representing at least one of a character string and a diagram is arranged, and the processing device 110. The processing device 110 executes the acquisition processing SA140, the identification processing SA150, and the moving processing SA160 described above. According to the image editing support device of the present aspect, since it is possible to move the movement target objects in a lump in accordance with the operation for moving the movement target object, it becomes possible to create the blank with a desired largeness with a simple operation to the display image PS in which at least one written object is arranged.

What is claimed is:

1. An image editing support method comprising:
   obtaining a reference position in a first image in which at least one first object representing at least one of a character string and a diagram is arranged;
   identifying, out of the at least one first object, a target object which is a first object located in a range including the reference position;
   receiving an operation of designating a largeness of a blank around the reference position;
   moving the target object in accordance with the operation; and
   displaying a second object to receive the operation at the reference position, wherein
   the second object is an object not written by a user.

2. The image editing support method according to claim 1, wherein
   the operation is an operation for enlarging the blank, and
   the moving the target object is moving the target object in a direction in which the target object gets away from the reference position.

3. The image editing support method according to claim 1, wherein
   the operation is an operation for reducing the blank, and
   the moving the target object is moving the target object in a direction in which the target object comes closer to the reference position.

4. The image editing support method according to claim 1, further comprising:
   displaying a second image representing a profile including the range, the second image being superimposed on the first image.

5. The image editing support method according to claim 1, wherein
   the range is a range in which the second object exists in the first image.

6. The image editing support method according to claim 1, wherein
   the target object is moved along an axis determined in accordance with a shape of the second object.

7. The image editing support method according to claim 1, wherein
   an upper limit of an amount of movement of the target object is determined in accordance with a length of a period in which the operation continues.

8. The image editing support method according to claim 7, further comprising:
   stopping the movement of the target object when the target object becomes to fail to overlap the range.

9. The image editing support method according to claim 1, further comprising:
   displaying a third image representing a profile including the at least one first object, the third image being superimposed on the first image.

10. The image editing support method according to claim 1, wherein the at least one first object includes a third object different from the target object, and the method further comprising moving the third object when a distance between a center of the target object and a center of the third object becomes shorter than a threshold value by moving the target object.

11. An image editing support device comprising:

a display device which displays a first image in which at least one first object representing at least one of a character string and a diagram is arranged; and a processing device programmed to execute obtaining a reference position in the first image, identifying, out of the at least one first object, a target object as a first object located in a range including the reference position, receiving an operation of designating a largeness of a blank around the reference position, moving the target object in accordance with the operation; and displaying a second object to receive the operation at the reference position, wherein the second object is an object not written by a user.

12. An image editing support method comprising:

obtaining a reference position in a first image in which at least one first object representing at least one of a character string and a diagram is arranged;

identifying, out of the at least one first object, a target object which is a first object located in a range including the reference position;

receiving an operation of designating a largeness of a blank around the reference position;

moving the target object in accordance with the operation; and displaying a second object to receive the operation at the reference position, wherein the target object is moved along an axis determined in accordance with a shape of the second object.

* * * * *